United States Patent
Yamura

(10) Patent No.: US 7,244,280 B2
(45) Date of Patent: Jul. 17, 2007

(54) METHOD FOR PRODUCING ELECTROCHEMICAL DEVICE

(75) Inventor: Kiyoshi Yamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 10/506,464

(22) PCT Filed: Dec. 26, 2003

(86) PCT No.: PCT/JP03/16957

§ 371 (c)(1),
(2), (4) Date: Sep. 1, 2004

(87) PCT Pub. No.: WO2004/068621

PCT Pub. Date: Aug. 12, 2004

(65) Prior Publication Data

US 2005/0148458 A1     Jul. 7, 2005

(30) Foreign Application Priority Data

Jan. 28, 2003    (JP)    ............................. 2003-018491

(51) Int. Cl.
H01M 8/10    (2006.01)
H01M 8/14    (2006.01)
H01M 10/04   (2006.01)

(52) U.S. Cl. ................. 29/623.5; 429/12; 429/41; 429/42; 429/33; 29/623.4

(58) Field of Classification Search .... 29/623.4–623.5; 429/12, 33, 41, 42
See application file for complete search history.

(56) References Cited

U.S. PATENT DOCUMENTS 5,399,184 A    3/1995    Harada

FOREIGN PATENT DOCUMENTS

| JP | 61-67787 | 4/1986 |
|----|----------|--------|
| JP | 61-67788 | 4/1986 |
| JP | 03-208260 | 9/1991 |
| JP | WO 98/22989 | 5/1998 |
| JP | 2002-237308 | 8/2002 |
| WO | WO 98/50479 | * 11/1998 |

OTHER PUBLICATIONS

Lehtinen et al., "Electrochemical characterization of PVDF-based proton conducting membranes for fuel cells," Electrochimica Acta, 1998, vol. 43, Nos. 12-13, pp. 1881-1890.

Flint, et al., "Investigation of radiation-grafted PVDF-g-polystyrene-sulfonic-acid ion exchange membrances for use in hydrogen oxygen fuel cells," Solid State Ionics, 1997, vol. 97, pp. 299-307.

* cited by examiner

*Primary Examiner*—Mark Ruthkosky
(74) *Attorney, Agent, or Firm*—Bell, Boyd & Lloyd LLP

(57) ABSTRACT

A method for producing an electrochemical device which exhibits improved output performance and improved durability in thermal, chemical, and mechanical is provided. The electrochemical device includes a first electrode, a second electrode, and an ion exchange membrane held between the two electrodes. The method includes forming a catalyst layer containing a catalytic substance such as platinum and polyvinylidene fluoride and attaching ion exchange groups to the polyvinylidene fluoride in the catalyst layer. The resulting catalyst layer containing ion exchange groups is used for at least either of the first and second electrodes.

8 Claims, 4 Drawing Sheets

Vessel for reaction with ion exchange groups

METHOD FOR PRODUCING ELECTROCHEMICAL DEVICE

CROSS REFERENCES TO RELATED APPLICATIONS

The present application claims priority to Japanese Patent Document No. P2003-018491 filed on Jan. 28, 2003, the disclosure of which is herein incorporated by reference.

BACKGROUND OF THE INVENTION

The present invention relates to a method for producing an electrochemical device.

The existing electrochemical device that is fueled by alcohol aqueous solution is composed of an anode electrode, a cathode electrode, and an ion exchange membrane formed from a polymeric solid electrolyte, all of which constitute the MEA (Membrane & Electrode Assembly). The ion exchange membrane is usually made of monomer such as Nafion (a registered trade mark of DuPont for perfluorosulfonic acid resin), which has a high ion conductivity. Nafion is used also as a binder in the electrode. (See, for example, Japanese Patent Laid-open No. Sho 61-67787 (from column 11, line 16, to column 15, line 7) and Japanese Patent Laid-open No. Sho 61-67788 (from column 12, line 9, to column 16, line 2.)

The fuel for the electrochemical device is dominated chiefly by methanol. Other fuels under study include hydrogen gas and organic materials such as ethanol, dimethyl ether (DME), and diethyl ether (DEE). (See, for example, Japanese Patent Publication No. Hei 3-208260, from column 3, line 1 to line 16, and FIG. 1.)

Promising among these electrochemical devices is the direct methanol fuel cell (DMFC), which uses methanol aqueous solution as a fuel for direct reaction with the anode electrode. The DMFC is highly expected to be a small portable fuel cell as a next-generation power source on account of its high energy density.

The electrochemical device such as direct methanol fuel cell mentioned above is required to have improved output efficiency and durability. However, the direct methanol fuel cell is inferior to hydrogen fuel cells in thermal durability, chemical durability, and mechanical durability.

Nafion (registered trade mark) mentioned above or conventional sulfonated fluorocarbon polymer is liable to dissolve in the alcohol fuel and hence it liberates catalyst particles due to poor binding force, resulting in a reduced output. The tendency toward dissolution causes not only the peeling of the catalyst layer but also the weakening or breakage of the MBA film.

For this reason, the binder in the electrode and the ion exchange membrane (or polymeric solid electrolyte membrane) should be formed from a material which is hardly soluble in alcohol fuel and which has a high proton conductivity.

SUMMARY OF THE INVENTION

The present invention is directed to a method for producing an electrochemical device composed of a first electrode, a second electrode, and an ion exchange membrane held between these electrodes, which includes steps for forming a catalyst layer containing a catalytic substance and polyvinylidene fluoride and attaching ion exchange groups to the polyvinylidene fluoride in the catalyst layer, with the resulting catalyst layer containing ion exchange groups being used for at least either of the first and second electrodes.

The method according to the present invention starts with forming a catalyst layer from a catalytic substance and polyvinylidene fluoride which is insoluble in methanol and water. Subsequently, ion exchange groups are attached to the polyvinylidene fluoride in the catalyst layer. And, the resulting catalyst layer which contains ion exchange groups is used for at least either of the first and second electrodes. The catalytic substance firmly binds to the polyvinylidene fluoride and the catalyst layer helps the electrochemical device to retain good output performance for a long period of time. In addition, the above-mentioned procedure (in which ion exchange groups are attached after the catalyst layer has been formed) makes it easy to form the catalyst layer. By contrast, conventional sulfonated fluorocarbon polymer such as Nafion (registered trade mark) is soluble in alcohol fuel and electrochemical devices incorporated with it cause the catalytic substance to liberate and hence deteriorate in output performance. The present invention has improved output efficiency in addition to improved durability, such as thermal durability, chemical durability, and mechanical durability.

Moreover, being insoluble in methanol aqueous solution, the polyvinylidene fluoride mentioned above may be incorporated into an electrochemical device (such as direct methanol fuel cell) without the possibility that the catalyst layer peels off and the MEA (Membrane & Electrode Assembly) film breaks during operation. MEA is composed of the first and second electrodes and the ion exchange membrane.

Thus, the present invention contributes to an electrochemical device having improved output performance and improved durability in thermal, chemical, and mechanical.

Additional features and advantages of the present invention are described in, and will be apparent from, the following Detailed Description of the Invention and the figures.

DETAILED DESCRIPTION OF THE INVENTION

Figure 1:
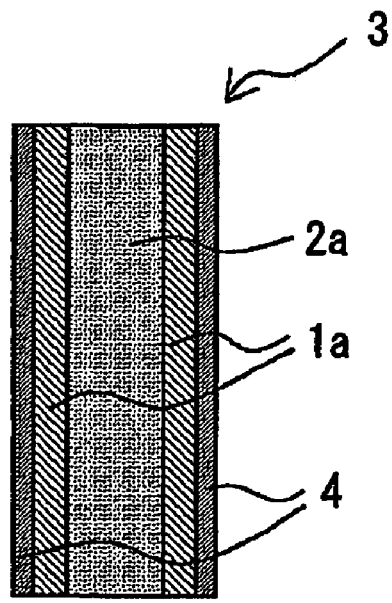
FIG. 1 is a schematic sectional view showing the method for producing an electrochemical device according to one embodiment of the present invention.
Figure 1:
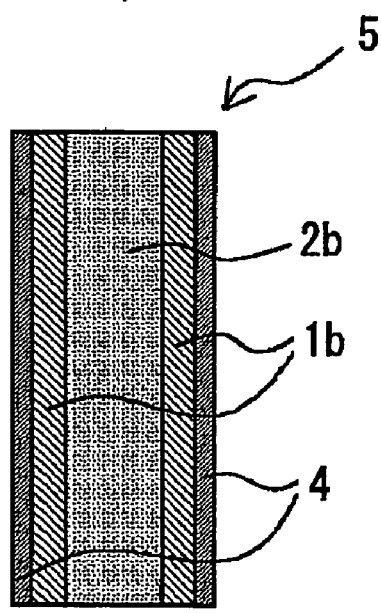

According to the present invention, the method for producing an electrochemical device includes forming a catalyst layer containing a catalytic substance and polyvinylidene fluoride (PVDF) and attaching ion exchange groups to the PVDF in the catalyst layer. The resulting catalyst layer containing ion exchange groups may be used for at least either of the first and second electrodes. The procedure should preferably be carried out by bonding the catalyst layer to a precursor of ion exchange membrane composed of polyvinylidene fluoride and bringing the bonded body into contact with a compound containing ion exchange groups, thereby introducing (through substitution) ion exchange groups into the polyvinylidene fluoride in the bonded body.

The foregoing procedure will be described below more specifically with reference to FIG. 1, which is a schematic sectional view showing the method for producing an electrochemical device according to one embodiment of the present invention. The first step is to bond together the catalyst layer 1a which contains a catalytic substance such as platinum and polyvinylidene fluoride and the precursor of ion exchange membrane 2a which is composed of polyvinylidene fluoride, thereby forming the bonded body 3 which functions as the MEA. In other words, the bonded body 3 includes the current collector 4 which functions as the first electrode, the catalyst layer 1a, the precursor of ion exchange membrane 2a, the catalyst layer 1a, and the current collector 4 which functions as the second electrode.

Then, the bonded body 3 is dipped in a solution of a compound containing ion exchange groups with heating under pressure, so that the compound infiltrates into the catalyst layer 1a and the precursor of ion exchange membrane 2a. In this way, fluorine atoms in the polyvinylidene fluoride are substituted by the ion exchange groups. Dipping conditions may vary as follows depending on the thickness and composition of the bonded body 3.

Concentration of solution: 5 to 10 mol/L
Pressure: 202650 to 303975 Pa
Temperature: 120 to 140° C.
Duration of dipping: 60 to 600 min In this way, there is obtained the MEA film 5 which is composed of the catalyst layers 1b (each composed of the polyvinylidene fluoride containing ion exchange groups and the catalytic substance), the ion exchange membrane 2b (composed of the polyvinylidene fluoride having ion exchange groups), and the current collectors 4.

Incidentally, the polyvinylidene fluoride should preferably have a weight-average molecular weight of about $1.0 \times 10^5$ to about $1.0 \times 10^6$.

Examples of the ion exchange groups include sulfonate group ($-SO_3H$), carboxyl group ($-COOH$), phosphate group ($-PO_3H$), linear sulfone group ($-(CH_2)_nSO_3H$, n=integer), perfluorocarbon liner sulfone group ($-(CF_2)_n SO_3H$, n in n integer) and the like. The ion exchange capacity (IEC) should preferably be about 0.9 to about 2.0 meq/g, more preferably about 0.9 to about 1.2 meq/g. This concentration is achieved easily and quantitatively by controlling the concentration of the solution.

Examples of the catalytic substance include platinum, ruthenium, palladium, silicon, carbon, aluminum, magnesium, cobalt, iron, nickel, molybdenum, and tungsten, which are known well. The catalytic substance should be used in an amount of about 0.15 to about 1.0 gram per g of catalyst or about 0.1 to about 2.0 mg per $cm^2$ of its support. The catalyst should have a particle diameter of about 1 to about 20 nm. The current collector 4 (as the first and second electrodes) may be made of any well-known material such as carbon.

According to the present invention in an embodiment, the method for producing an electrochemical device includes forming the catalyst layer 1a from polyvinylidene fluoride (insoluble in methanol and water) and a catalytic substance, bonding the catalyst layer to the precursor of ion exchange membrane 2a, and dipping with heating under pressure the bonded body 3 in a solution of a compound containing ion exchange groups, thereby introducing (through substitution) the ion exchange groups into the polyvinylidene fluoride as the constituent of the catalysts layer 1a and the precursor of ion exchange membrane 2a. The electrochemical device produced in this manner retains good output performance owing to the catalytic substance firmly adhering to the catalyst layer.

Since the polyvinylidene fluoride is insoluble in methanol aqueous solution as mentioned above, the MEA film 5 can be used as an electrochemical device (such as direct methanol fuel cell) without the possibility that the catalyst layer 1b peels off or the MEA film 5 breaks.

The thus obtained electrochemical device has improved output efficiency and improved durability in thermal, chemical, and mechanical.

The electrochemical device to be produced by the method of the present invention should preferably be a fuel cell.

Figure 2:
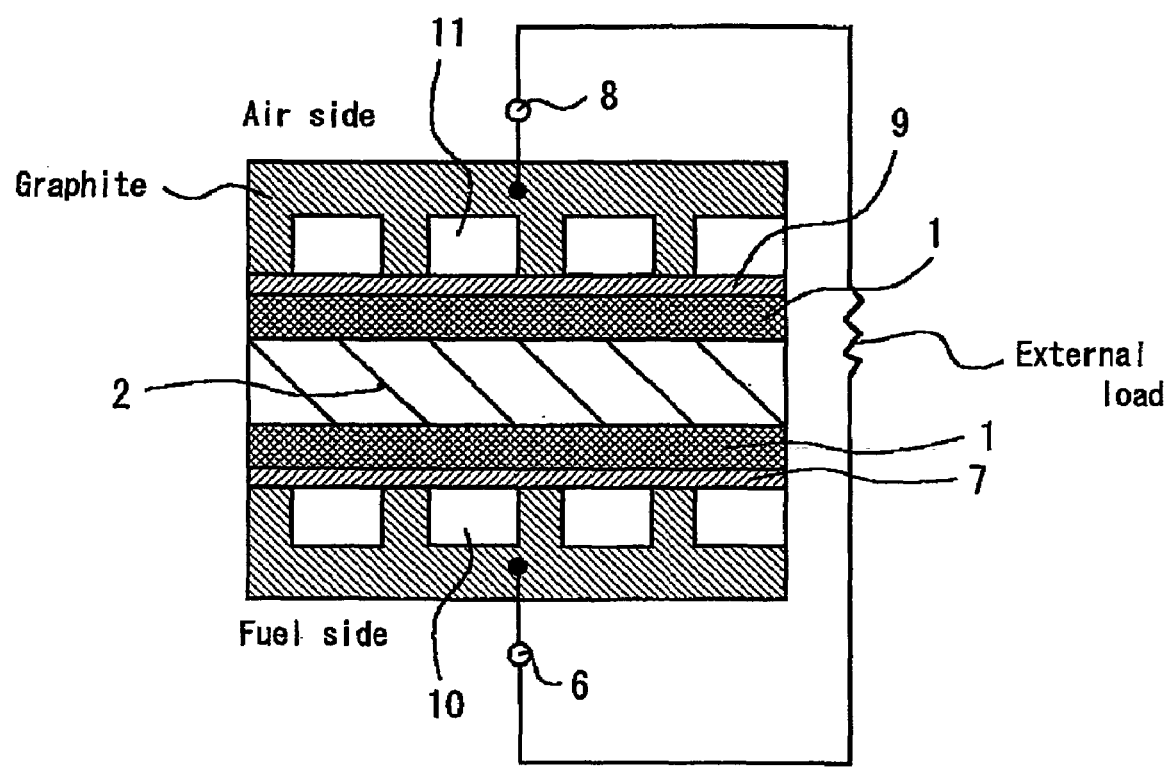
FIG. 2 is a schematic sectional view of the electrochemical device.

FIG. 2 is a schematic sectional view of a fuel cell as the electrochemical device produced by the method of the present invention.

This fuel cell is made up of a cathode 7 (fuel electrode or hydrogen electrode) having a terminal 6, an anode 9 (oxygen electrode) having a terminal 8, and an ion exchange membrane 2 as an electrolyte held between the two electrodes. The cathode 7 and anode 8 each has a catalyst layer 1.

The multi-layered film (MEA) composed of the cathode 7, anode 9, and ion exchange membrane 2 may be formed by the method for producing an electrochemical device according to the present invention.

First, the catalyst layer containing a catalytic substance such as platinum and polyvinylidene fluoride is formed on current collectors such as carbon sheet, each functioning as the cathode 7 and the anode 9. Then, the precursor of ion exchange membrane composed of polyvinylidene fluoride is held between and bonded to the cathode 7 and the anode 9 (to which the catalyst layer has been attached) such that it comes into contact with the catalyst layers.

Subsequently, the resulting bonded body is dipped with heating under pressure in a solution of a compound containing ion exchange groups, so that the ion exchange groups are introduced through substitution, into the polyvinylidene fluoride constituting the catalyst layer and the precursor of ion exchange membrane. In this way there is obtained the multi-layered film (MEA film) composed of the cathode 7, the anode 9, and the ion exchange membrane 2.

The fuel cell mentioned above works in the following manner. The cathode 7 is supplied with methanol aqueous solution through the passage 10 for methanol aqueous solution passage. Hydrogen ions are liberated from the methanol (or fuel) while the methanol aqueous solution is passing through the passage 10, and migrate to the anode 9 with the hydrogen ions liberated at the ion exchange membrane 2, at which they react with oxygen (air) passing through the oxygen passage 11. This chemical reaction generates the desired electromotive force.

The foregoing structure may be modified such that an integral unit is formed from more than one MEA film composed of the cathode 7 (with the catalyst layer 1), the ion exchange membrane 2, and the anode 9 (with the catalyst layer 1). Such a modified structure produces a higher electromotive force easily. The methanol aqueous solution as a fuel (which is supplied through the passage 10 as explained above) can be replaced by hydrogen gas.

The fuel cell mentioned above is produced by preparing a catalyst layer from polyvinylidene fluoride (insoluble in methanol and water) and a catalytic substance, bonding the catalyst layer to a precursor of ion exchange membrane composed of polyvinylidene fluoride, and dipping with heating under pressure the bonded body in a solution of a compound containing ion exchange groups, thereby introducing (through substitution) the ion exchange groups into the polyvinylidene fluoride constituting the catalyst layer and the precursor of ion exchange membrane. The fuel cell produced in this manner keeps the catalytic substance firmly adhering and retains good output performance for a long period of time.

Being insoluble in methanol aqueous solution, the polyvinylidene fluoride can be applied to the direct methanol fuel cell without the possibility that the catalyst layer 1 peels off and the MEA film breaks during operation.

Consequently, the resulting fuel cell has improved output performance and improved durability.

The foregoing description is based on the assumption that the electrochemical device will be used as a fuel cell. However, the electrochemical device can also be used as a hydrogen producing apparatus which is based on the principle opposite to that of fuel cells. It may also be used as a lithium cell which employs a solid electrolyte capable of conducting lithium ions, a water electrolyzer which employs a solid electrolyte capable of conducting protons, or a proton pump.

The foregoing deals with the process for producing the MEA film 5 composed of the catalyst layers 1b containing ion exchange groups, the ion exchange membrane 2b, and the current collectors 4, by forming the bonded body 3 and then dipping the bonded body 3 in a solution of a compound containing ion exchange groups, thereby introducing (through substitution) the ion exchange groups into the polyvinylidene fluoride in the bonded body 3, as shown in FIG. 1. The method of the present invention may be applied to an electrochemical device in which at least either of the first and second electrodes has the catalyst layer 1b containing ion exchange groups.

Moreover, the ion exchange membrane 2b held between the electrodes may be any one of Nafion (registered trademark) (perfluorosulfonic acid), non-fluorocarbon sulfonic acid, partially fluorinated carbon sulfonic acid, perfluorocarboxylic acid, non-fluorocarbon carboxylic acid, partially fluorinated carbon carboxylic acid, perfluorophosphoric acid, non-fluorocarbon phosphoric acid, partially fluorinated carbon phosphoric acid and the like. In this case, the other catalyst layer may be formed from other polymeric compounds such as Nafion (registered trade mark). Alternatively, it is also possible to bond the catalyst layer 1b, which has undergone dipping, to a separately prepared ion exchange membrane.

The invention will be described in more detail with reference to the following Examples, which demonstrate the method for producing the electrochemical device according to various embodiments of the present invention.

EXAMPLE 1

A solution was made by dissolving polyvinylidene fluoride (PVDF, from Aldrich) having a molecular weight of 150000 in NMP (1-methyl-2-pyrrolidone).

To this solution was added a catalyst for fuel cell (Pt—Ru/C, from Tanaka Precious Metals) such that the ratio of PVDF to the catalyst is 0.6:1.0. After stirring for 24 hours, there was obtained a dispersion for the anode catalyst. The catalyst for fuel cell is composed of Pt, Ru, and C in a ratio of 23:22:55 by weight. A dispersion for the cathode catalyst was prepared in the same way as above from a catalyst for fuel cell composed of Pt and C in a ratio of 0.46:0.54 by weight (from Tanaka Precious Metals).

The solution of PVDF was cast alone onto a polyimide film (20 μm thick). After drying at about 40° C. under normal humidity, there was obtained a PVDF film (about 50 μm thick).

The dispersions for the anode catalyst and cathode catalyst were individually applied to a carbon sheet (from Electrochemical). Upon drying, there were obtained the cathode electrode and the anode electrode, each carrying 1.0 mg of Pt per $cm^2$.

The cathode and anode electrodes thus obtained were placed on both sides of the PVDF film, and they were bonded together by hot pressing at 100° C. and about 30 $kgf/cm^2$ for 5–10 minutes. Thus there was obtained an untreated MEA.

The thus obtained untreated MEA was dipped in an aqueous solution of methane sulfonic acid (1 M) and heated at 130° C. and 202650 Pa (2 atm) in an autoclave. Thus there was obtained a treated MEA in which PVDF was methane sulfonated. The treated MEA was washed with pure water to remove excess methane sulfonic acid. The MEA was tested for fuel cell performance in the following manner.

Gas for the oxygen electrode: atmospheric air, 100% humidity, 40° C., 100 mL/min Fuel for the fuel electrode: 1 M MeOH aqueous solution Electricity generation without reflux: 0.3 V, continuous Current density was measured at t=0 and at intervals of five minutes.

Ambient temperature: 22° C.

Relative humidity: 51%

Figure 3:
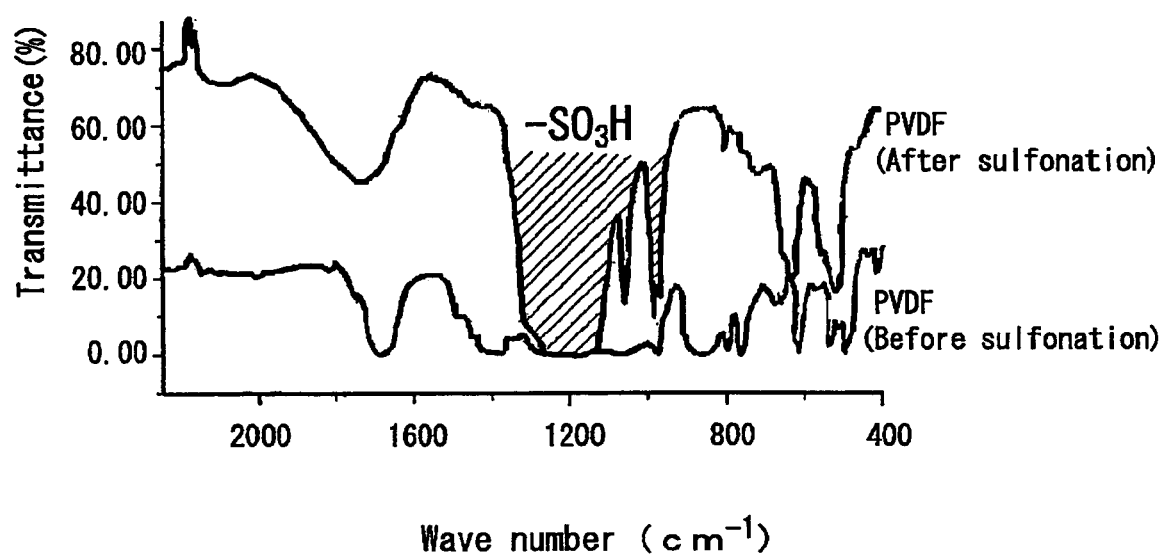
FIG. 3 is a graph showing IR spectra obtained from the MEA before and after treatment in the example of the present invention.

It is clear from FIG. 3 showing the IR spectra of the untreated MEA and treated MEA that sulfonic groups (—$SO_3H$) have been introduced (through substitution) into PVDF after treatment.

COMPARATIVE EXAMPLE 1

The same procedure as in EXAMPLE 1 was repeated to produce the MEA except that the electrolytic film (ion exchange membrane) was replaced by "Nafion 112 (registered trade mark)" of the same thickness and the PVDF for the anode electrode and cathode electrode was replaced by "Nafion" (Furuuchi Chemical, EW1100, SE20192). The resulting MEA was tested for fuel cell performance.

Figure 4:
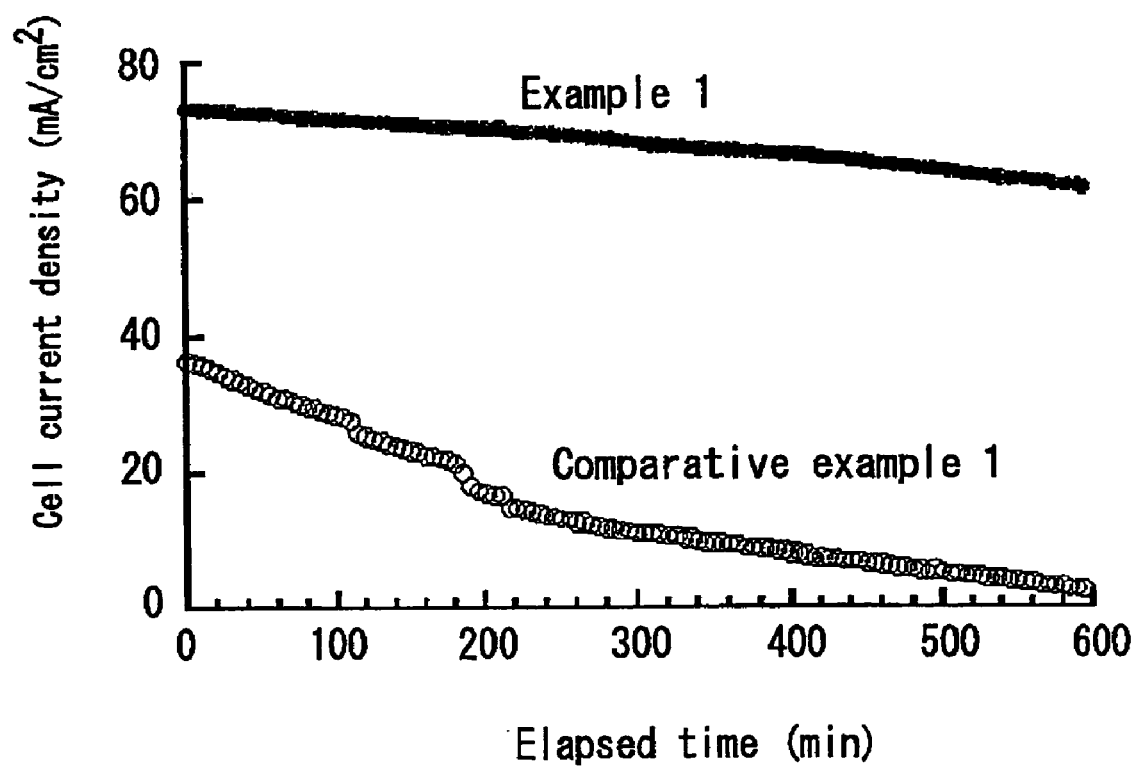
FIG. 4 is a graph showing the relation between the current density and the elapsed time.

FIG. 4 shows the output (changing with time) measured in EXAMPLE 1 and COMPARATIVE EXAMPLE 1.

It is apparent from FIG. 4 that since, according to an embodiment of the present invention, the electrochemical device (fuel cell) is produced by preparing the catalyst layer from polyvinylidene fluoride (insoluble in methanol and water) and the catalytic substance, bonding the catalyst layer to a precursor of ion exchange membrane composed of polyvinylidene fluoride, and dipping with heating under pressure the bonded body in a solution of a compound containing ion exchange groups, thereby introducing (through substitution) the ion exchange groups into the polyvinylidene fluoride constituting the catalyst layer and the precursor of ion exchange membrane, the resulting fuel cell keeps the catalytic substance firmly adhering and retains good output performance for a long period of time.

Being insoluble in methanol aqueous solution, the polyvinylidene fluoride can be applied to the direct methanol fuel cell without the possibility that the catalyst layer peels off and the MEA film breaks during operation.

This contributes to fuel cells having improved output performance and improved durability.

According to an embodiment of the present invention, the catalyst layer containing a catalytic substance and polyvinylidene fluoride (insoluble in methanol and water) is formed and then ion exchange groups are attached to the polyvinylidene fluoride in the catalyst layer and the resulting catalyst layer containing ion exchange groups is used for at least either of the first and second electrodes. Therefore, the polyvinylidene fluoride firmly adheres to the catalytic substance and the resulting electrochemical device retains outstanding output performance for a long period of time. Moreover, since the ion exchange groups are attached after the catalyst layer has been formed, the catalyst layer can be formed easily.

Moreover, since the polyvinylidene fluoride is insoluble in methanol aqueous solution, the electrochemical device may be used as the direct methanol fuel cell which works without the possibility that the catalyst layer peels off during operation and the MEA (Membrane & Electrode Assembly) film (composed of the ion exchange membrane and the first and second electrodes) breaks during operation.

Therefore, the resulting electrochemical device exhibits improved output performance and improved durability in thermal, chemical, and mechanical.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for producing an electrochemical device composed of a first electrode, a second electrode, and an ion exchange membrane held between the first and second electrodes, comprising forming a catalyst layer containing a catalytic substance and polyvinylidene fluoride; and attaching one or more ion exchange groups to the polyvinylidene fluoride in the catalyst layer such that the catalyst layer contains the ion exchange groups that can be used for at least one of the first and second electrodes; bonding the catalyst layer to a precursor of the ion exchange membrane composed of polyvinylidene fluoride to form a bonded body; and bringing the bonded body into contact with a compound containing the ion exchange groups, thereby introducing the ion exchange groups into the polyvinylidene fluoride in the bonded body through substitution.

2. The method for producing an electrochemical device as defined in claim 1, further comprising dipping with heating under pressure the bonded body in a solution of a compound containing the ion exchange groups, thereby introducing the ion exchange groups into the polyvinylidene fluoride constituting the catalyst layer and the precursor of ion exchange membrane through substitution.

3. The method for producing an electrochemical device as defined in claim 2, further comprising laminating the first electrode, the catalyst layer, the precursor of ion exchange membrane, the catalyst layer, and the second electrode to form a laminated, and subsequently dipping the laminate in the solution.

4. The method for producing an electrochemical device as defined in claim 1, wherein the ion exchange group includes at least one species selected from the group consisting of a sulfonate group, a carboxyl group, a phosphate group, a linear sulfone group, and a perfluorocarbon liner sulfone group.

5. The method for producing an electrochemical device as defined in claim 1, wherein the catalyst substance contains at least one species selected from the group consisting of platinum, ruthenium, palladium, silicon, carbon, aluminum, magnesium, cobalt, iron, nickel, molybdenum, and tungsten.

6. The method for producing an electrochemical device as defined in claim 1, wherein the ion exchange membrane includes at least one species of ion exchanging material selected from the group consisting of perfluorocarbon sulfonic acid, non-fluorocarbon sulfonic acid, partially fluorinated carbon sulfonic acid, perfluorocarboxylic acid, non-fluorocarbon carboxylic acid, partially fluorinated carbon carboxylic acid, perfluorophosphoric acid, non-fluorocarbon phosphoric acid, and partially fluorinated carbon phosphoric acid.

7. The method for producing an electrochemical device as defined in claim 1, wherein the ion exchange membrane is prepared to function as an electrolyte.

8. The method for producing an electrochemical device as defined in claim 1, wherein the electrochemical device includes a fuel cell.

* * * * *